United States Patent
Kellij et al.

(10) Patent No.: US 12,085,381 B2
(45) Date of Patent: Sep. 10, 2024

(54) CALIBRATION TOOL AND METHOD

(71) Applicant: VMI HOLLAND B.V., Epe (NL)

(72) Inventors: Egbert Grietinus Kellij, Epe (NL); John Van De Vrugt, Epe (NL); Niels Tielenburg, Epe (NL); Teunis Johannes Verbruggen, Epe (NL); Peter Beekman, Epe (NL); Cees Johan Van Voskuilen, Epe (NL); Robin Nusselder, Epe (NL); Gerjan Asuerus Berghorst, Epe (NL); Titus Ruben Verlaan, Epe (NL); Bart Kofoed, Epe (NL); Quinten Matthijs Bergmans, Epe (NL)

(73) Assignee: VMI HOLLAND B.V., Epe (NL)

( * ) Notice: Subject to any disclaimer, the term of this patent is extended or adjusted under 35 U.S.C. 154(b) by 441 days.

(21) Appl. No.: 17/599,321

(22) PCT Filed: Mar. 13, 2020

(86) PCT No.: PCT/NL2020/050167
§ 371 (c)(1),
(2) Date: Sep. 28, 2021

(87) PCT Pub. No.: WO2020/204698
PCT Pub. Date: Oct. 8, 2020

(65) Prior Publication Data
US 2022/0163322 A1    May 26, 2022

(30) Foreign Application Priority Data
Apr. 5, 2019   (NL) ..................................... 2022874

(51) Int. Cl.
*G01B 11/25*     (2006.01)
*B29D 30/00*     (2006.01)
(Continued)

(52) U.S. Cl.
CPC ...... *G01B 11/2504* (2013.01); *B29D 30/0061* (2013.01); *B29D 30/244* (2013.01);
(Continued)

(58) Field of Classification Search
CPC ..... G01S 7/497; G01S 17/48; G01B 11/2504; G06T 7/80; B29D 30/244;
(Continued)

(56) References Cited

U.S. PATENT DOCUMENTS 4,988,194 A    1/1991  Hara et al.
5,506,683 A *  4/1996  Yang .................. G01B 11/2518
                                                356/606

(Continued)

FOREIGN PATENT DOCUMENTS

CN    102539050 A    7/2012
CN    113237434 A    8/2021
(Continued)

OTHER PUBLICATIONS

Yuichi et al "Method and Device for Measuring Flat Plate Flatness", Sep. 13, 2007, JP 2007232649A (Year: 2007).*
(Continued)

*Primary Examiner* — Sang H Nguyen
(74) *Attorney, Agent, or Firm* — Workman Nydegger (57) ABSTRACT

The invention relates to a calibration tool and a method for calibrating a laser-triangulation measuring system, wherein the calibration tool comprises a tool body that defines a reference plane and that is rotatable relative to the measuring system about a rotation axis perpendicular to said reference plane, wherein the tool body is provided with one or more calibration surfaces that define a pattern of calibration positions, wherein the pattern comprises at least three columns extending in a radial direction away from the rotation axis and at least three rows extending in a circumferential
(Continued)

direction about the rotation axis, wherein for each column the calibration positions within said respective column vary in height relative to the reference plane in a height direction perpendicular to said reference plane and wherein for each row the calibration positions within the respective row vary in height in the height direction relative to the reference plane.

26 Claims, 8 Drawing Sheets

(51) Int. Cl.
| | | |
|---|---|---|
| B29D 30/24 | (2006.01) | |
| B29D 30/26 | (2006.01) | |
| B29D 30/32 | (2006.01) | |
| B29D 30/48 | (2006.01) | |
| G01C 11/30 | (2006.01) | |
| G01S 7/497 | (2006.01) | |

(52) U.S. Cl.
CPC ............ *B29D 30/26* (2013.01); *B29D 30/32* (2013.01); *B29D 30/48* (2013.01); *G01C 11/30* (2013.01); *G01S 7/497* (2013.01); *B29D 2030/3207* (2013.01); *B29D 2030/482* (2013.01)

(58) Field of Classification Search
CPC ...... B29D 2030/482; B29D 2030/3207; G01C 11/02; G01M 11/0264
See application file for complete search history.

(56) References Cited

U.S. PATENT DOCUMENTS

| | | | |
|---|---|---|---|
| 5,546,330 A | 8/1996 | Sergel et al. | |
| 6,822,748 B2 | 11/2004 | Johnston et al. | |
| 7,837,816 B2 | 11/2010 | Linne et al. | |
| 10,792,877 B2 | 10/2020 | Kaagman et al. | |
| 11,383,470 B2 | 7/2022 | Cicognani et al. | |
| 2002/0050988 A1* | 5/2002 | Petrov | G06V 10/10 345/418 |
| 2004/0141187 A1* | 7/2004 | Johnston | G01B 21/042 356/608 |
| 2007/0261780 A1 | 11/2007 | Linne et al. | |
| 2008/0075324 A1* | 3/2008 | Sato | G06T 7/80 348/E13.005 |
| 2008/0201015 A1* | 8/2008 | Brogardh | B25J 9/1692 901/30 |
| 2009/0051935 A1* | 2/2009 | Cooper | B23K 26/042 356/616 |
| 2009/0245616 A1* | 10/2009 | De La Ballina | G01B 11/0608 382/141 |
| 2012/0079868 A1 | 4/2012 | Okada et al. | |
| 2014/0083161 A1* | 3/2014 | Pucnik | G01B 21/042 73/1.79 |
| 2016/0263849 A1 | 9/2016 | Cicognani et al. | |
| 2017/0264885 A1* | 9/2017 | Haugan | G06T 7/85 |
| 2017/0274607 A1 | 9/2017 | Matsumura | |
| 2017/0368777 A1 | 12/2017 | Kaagman et al. | |
| 2022/0297399 A1 | 9/2022 | Cicognani et al. | |

FOREIGN PATENT DOCUMENTS

| | | |
|---|---|---|
| EP | 2265434 A1 | 12/2010 |
| JP | S64013408 A | 1/1989 |
| JP | H07151501 A | 6/1995 |
| JP | 2008170279 A | 7/2008 |
| JP | 2009031120 A | 2/2009 |
| JP | 5030699 B2 | 9/2012 |
| JP | 2013148375 A | 8/2013 |
| JP | 2013221766 A | 10/2013 |
| JP | 2016099287 A | 5/2016 |
| JP | 2018096844 A | 6/2018 |
| JP | 6420639 B2 | 11/2018 |
| KR | 1019920006050 B1 | 7/1992 |
| KR | 1020170106357 A | 9/2017 |
| KR | 1020170126042 A | 11/2017 |
| KR | 102005348 B1 | 7/2019 |
| RU | 2007104349 A | 8/2008 |
| RU | 2358871 C2 | 6/2009 |
| RU | 2016118553 A | 11/2017 |
| RU | 2663055 C2 | 8/2018 |
| RU | 2017126707 A | 2/2019 |
| RU | 2689598 C2 | 5/2019 |
| WO | 2016122311 A1 | 8/2016 |
| WO | 2017039433 A1 | 3/2017 |

OTHER PUBLICATIONS

International Search Report and Written Opinion from PCT Application No. PCT/NL2020/050167, Sep. 4, 2020.
Dutch Search Report with Written Opinion from corresponding Application No. NL 2022874, Dec. 20, 2019.
Aquilar et al., "Stereo Vision for 3D Measurement: Accuracy Analysis, Calibration and Industrial Applications," Measurement, vol. 18, Issue 4, Aug. 1, 1996, pp. 193-200.
Jung et al., "Time-of-Flight Sensor Calibration for a Color and Depth Camera Pair," IEEE Transactions on Pattern Analysis and Machine Intelligence, vol. 37, No. 7, Oct. 17, 2014, pp. 1501-1513.
Decision of Grant for Corresponding Japanese Patent Application No. JP2021-557274, Jan. 9, 2024.
Office Action from corresponding Korean Application No. 10-2021-7009615, Oct. 4, 2022.
Russian Decision to Grant from Corresponding Russian Patent Application No. RU2021123095, Jul. 13, 2023.
Aguilar et al., "Stereo Vision for 3D Measurement: Accuracy Analysis, Calibration and Industrial Applications," Measurement, vol. 18, Issue 4, Aug. 1, 1996, pp. 193-200.
Taiwanese Office Action from Corresponding Taiwanese Patent Application No. TW109111438, Jan. 25, 2024.

\* cited by examiner

CALIBRATION TOOL AND METHOD

BACKGROUND

The invention relates to a calibration tool and a method for calibrating a measuring system, in particular a laser-triangulation measuring system.

Measuring systems are used in the field of tire building during various stages of production to measure the quality and/or characteristics of one or more tire components. One of said stages is the production of a bead-apex. The bead-apex is formed by subsequently applying a bead and an apex around the circumference of a bead-apex drum. The bead-apex drum may receive beads and apexes in a wide variety of shapes and sizes. Moreover, the bead-apex drum also comes in various shapes and sizes and may be replaced by another bead-apex drum when appropriate. Finally, the part of the bead-apex drum that supports the apex is typically conical to support the apex at an oblique angle to the radial direction.

SUMMARY OF THE INVENTION

A disadvantage of the known laser-triangulation measuring system is that it may become inaccurate over time. It is known to calibrate a laser-triangulation measuring system by measuring a stationary object with predetermined dimensions and by comparing the measurements with the predetermined dimensions. However, this process of calibration only provides a limited amount of feedback based on the dimensions of the stationary object. Although the measuring system may be properly calibrated for the dimensions of the stationary object, measurements in other dimension ranges are still uncalibrated and may be inaccurate.

It is an object of the present invention to provide a calibration tool and a method for calibrating a measuring system, in particular a laser-triangulation measuring system, wherein the calibration can be improved.

According to a first aspect, the invention provides a calibration tool for calibrating a laser-triangulation measuring system, wherein the calibration tool comprises a tool body that is rotatable relative to the measuring system about a rotation axis perpendicular to a reference plane, wherein the tool body is provided with one or more calibration surfaces that define a pattern, in particular a radial grid, of calibration positions, wherein the pattern comprises at least three columns extending in a radial direction away from the rotation axis and at least three rows extending in a circumferential direction about the rotation axis, wherein for each column the calibration positions within said respective column vary in height relative to the reference plane in a height direction perpendicular to said reference plane and wherein for each row the calibration positions within the respective row vary in height in the height direction relative to the reference plane.

The tool body can conveniently be rotated relative to the measuring system in the same way as the bead-apex drum. By rotating the tool body, the columns can be positioned, one-by-one, in a measuring position for measuring of the calibration positions within each column by the measuring system. In particular, the measuring system may project a laser line onto the tool body in or parallel to the radial direction so that all calibration positions in a respective one of the columns can be measured simultaneously along the same projected laser line. Each column of calibration positions represents or forms a specific height profile that can serve as a calibration for the measuring system. As the calibration positions are varied in height in both the columns as well as the rows, the measurements can be calibrated for a considerable number of calibration positions, thus providing the measuring system with a relatively large amount of feedback for various height positions.

Preferably, for each column at least half of the calibration positions and preferably all calibration positions within the respective column have different heights in the height direction relative to the reference plane. Hence, at least half of the calibration positions within the respective column generates unique calibration information for the calibration of the measuring system.

In one embodiment, for each column the calibration positions within the respective column are sequentially reduced in height relative to the reference plane in the radial direction away from the rotation axis. The sequential reduction in height can be similar to or representative of the declining height of a bead-apex supported on the bead-apex drum and can therefore provide useful calibration information for the calibration of the measuring system.

Preferably, the sequential reduction in height has a constant decrement relative to the reference plane. The calibration information generated by the calibration positions within the respective column can thus be used to determine a scale of the measuring system, in particular a scale for converting pixels to real-world units, i.e. millimeters. Alternatively, the sequential reduction in height follows a curvature. Said curvature can for example be chosen to match or correct for a certain lens distortion effect as a result of the camera used in the measuring system.

Additionally or alternatively, for each row at least half of the calibration positions and preferably all calibration positions within the respective row have different heights in the height direction relative to the reference plane. Hence, at least half of the calibration positions within the respective row generates unique calibration information for the calibration of the measuring system.

In one embodiment, for each row the calibration positions within the respective row are sequentially increased in height relative to the reference plane in the circumferential direction. The calibration positions within the respective row can thus be representative of the various heights of different bead-apexes that are supported on the bead-apex drum at the radial position of the respective row. When combined with the sequential reduction of height in the radial direction within the columns, a pattern can be formed with columns of radially declining calibration positions that per column collectively increase in height in the circumferential direction with each row.

Preferably, the sequential increase in height has a constant increment relative to the reference plane. The calibration information generated by the calibration positions within the respective row can thus be used to determine a scale of the measuring system, in particular a scale for converting pixels to real-world units, i.e. millimeters.

In one embodiment, each calibration position within the pattern has a height in the height direction relative to the reference plane that is different from the heights of the other calibration positions relative to the reference plane in the same column and the same row. Hence, each calibration position within the pattern generates unique calibration information for the calibration of the measuring system.

The skilled person will appreciate that the calibration tool according to the invention may comprises only a single calibration surface in each column, in each row or for the pattern as a whole. Such a single calibration surface could for example have a gradually declining height in the radial direction and a gradually inclining height in the circumferential direction. The measuring system would then be configured to measure at certain locations on the single calibration surface, said locations corresponding to the calibration positions. The single calibration surface could hold an infinite number of calibration positions.

In contrast, in the embodiment as shown in the drawings, for each column the one or more calibration surfaces comprises an individual calibration surface for each calibration position within the respective column. By having distinct, individual calibration surfaces, the calibration positions are not easily confused and can be easily recognized by the measuring system, i.e. by detecting transitions from one calibration surface to another.

Preferably, for each column the tool body is provided with recesses extending between the calibration surfaces within the respective column to space apart said calibration surfaces in the radial direction. By spacing the columns apart, the calibration positions are even less likely to be confused. Moreover, the presence of the recess between the calibration surfaces allows for a distinct edge and/or a base level or zero level measurement in the recess.

More preferably, each calibration surface within the respective column defines a calibration edge at each transition from the respective calibration surface to an adjacent one of the recesses, wherein at least one of the calibration positions is located at one of said calibration edges. The calibration edges are easily detectable and/or measurable and can therefore serve as an excellent calibration position.

In a further embodiment, for each column the calibration surfaces within the respective column extend in a common plane, wherein said common plane extends at an oblique angle to the reference plane. The obliquely angled common plane is similar to or representative of the obliquely declining or conical surface of the bead-apex supported on the bead-apex drum. The common plane has the additional advantage that all calibration positions are also positioned in the same common plane.

Additionally or alternatively, for each row the one or more calibration surfaces comprises an individual calibration surface for each calibration position within the respective row. By having distinct, individual calibration surfaces, the calibration positions are not easily confused and can be easily recognized by the measuring system, i.e. by detecting transitions from one calibration surface to another.

Preferably, for each row the calibration surfaces within the respective row are stepped in the height direction from one of the calibration surfaces to the next one of the calibration surfaces in the circumferential direction. The stepped height from one calibration surface to the next means that—with each subsequent column—the calibration surfaces can be easily distinguished from the calibration surfaces of the previous column in the circumferential direction of the respective row. Moreover, the height of each calibration surface may be constant in the circumferential direction between the steps, so that representative measurements for the respective calibration position can be taken at any position in the circumferential direction between the steps. Therefore, the accuracy of the rotational positioning of the calibration tool relative to the measuring system is less critical.

In another embodiment, the pattern comprises at least five columns, preferably at least eight columns. Additionally or alternatively, the pattern comprises at least four rows, preferably at least five rows. The amount of columns determines the amount of height profiles that can be calibrated. The number of rows determines the amount of calibration positions within each column, i.e. within each height profile.

In a further embodiment the tool body extends over only a part of a full circumference about the rotation axis. Preferably, the tool body is formed as a circular segment. When the tool body is not a full ring or annulus, the tool body can be relatively compact, i.e. compared to the bead-apex drum.

According to a second aspect, the invention provides a method for calibrating a laser-triangulation measuring system with the use of the calibration tool according to any one of the aforementioned embodiments, wherein the laser-triangulation measuring system comprises a laser and a camera with a field of view, wherein the method comprises the steps of:

a) providing the calibration tool at least partially within the field of view of the camera;
b) projecting a laser line onto the calibration tool with the laser-triangulation measuring system;
c) rotating the calibration tool about the rotation axis such that the laser line is projected on all calibration positions of a respective one of the columns; and
d) capturing an image of the laser line projected on all calibration positions of the respective column with the camera.

The method relates to the practical implementation of the calibration tool according to the first aspect of the invention and thus has the same technical advantages, which will not be repeated hereafter.

In a preferred embodiment of the method, step d) comprises the step of repeating steps c) and d) for another one or all of the other columns. Hence, more or all calibration positions can be measured to have a maximum amount of calibration data.

In a further embodiment of the method the heights of the calibration positions of each column relative to the reference plane are predetermined, wherein the method further comprises the step of calibrating the laser-triangulation measuring system by correlating pixels in each captured image corresponding to the calibration positions of a respective column to the predetermined heights of said calibration positions within said respective column. The correlation can result in a scale for each calibration position that converts the pixels to real-world units, i.e. micrometers, millimeters or centimeters.

In a further embodiment the method further comprises the step of:

f) providing an empty bead-apex drum relative to the laser-triangulation measuring system prior to or after steps a) to e), wherein the bead-apex drum has a reference plane and a base profile for supporting a bead-apex relative to the reference plane, wherein the empty bead-apex drum is provided with its reference plane in the same position as the reference plane of the calibration tool;
g) projecting a laser line onto the empty bead-apex drum with the laser-triangulation measuring system;
h) capturing an image of the laser line projected on the empty bead-apex drum; and
i) determining the base profile of the empty bead-apex drum relative to the reference plane of the empty bead-apex drum.

During production of the bead-apexes, the base profile of the bead-apex drum is covered by the bead-apex currently supported on the bead-apex drum. Although the height of the bead-apex can be measured relative to reference plane can be measured, this measurement is not indicative of the actual height of the bead-apex relative to the bead-apex drum. Hence, when the base profile is determined prior to the production, i.e. when the bead-apex drum is still empty, the measuring system has more information from which the actual height of the bead-apex relative to the bead-apex drum can be determined.

Preferably, the method further comprises the steps of:
j) providing a bead-apex on the bead-apex drum;
k) measuring the bead-apex using the measuring system; and
l) subtracting the base profile of the empty bead-apex drum as determined in step i) from the measurements.

The result of the subtraction can be representative of the actual height of the bead-apex relative to the bead-apex drum.

According to a third, unclaimed aspect, the invention provides a calibration tool for calibrating a measuring system, wherein the calibration tool comprises a calibration section with one or more calibration elements and a validation section with one or more validation elements, wherein the calibration tool is invertible about an inverting axis between a calibration position and a validation position, wherein the calibration section and the validation section switch positions when inverting about the inverting axis.

The calibration tool can therefore also function as a validation tool, simply be changing its orientation, i.e. by flipping, reversing or inverting about the inverting axis. Consequently, no separate tooling is required to validate the measuring system after the initial calibration.

Preferably, the calibration tool has a longitudinal direction, wherein the calibration section and the validation section are arranged adjacent to each other in a lateral direction perpendicular to the longitudinal direction, wherein the inverting axis extends perpendicular to the longitudinal direction and the lateral direction between the calibration section and the validation section.

In a further embodiment the calibration tool comprises one or more mounting elements for mounting the calibration tool to a support relative to the measuring system, wherein the at least one of the one or more mounting elements is in the same position after inverting the calibration tool about the inverting axis. Hence, the same one or more mounting elements can be used to mount the calibration tool in either one of the positions.

In another embodiment the one or more calibration elements comprises a plurality of calibration elements arranged in a pattern extending in a longitudinal direction of the calibration tool, wherein the one or more validation elements comprises a plurality of validation elements which are in different positions in the longitudinal direction with respect to the plurality of calibration elements. By having the validation elements and the calibration elements in different positions, the measuring system can be validated using different values to determine if the scale determined during calibration correctly interpolates to the value that is expected at the validation elements.

In another embodiment the measuring system comprises a first camera and a second camera for observing a first end portion and a second end portion, respectively, of the calibration tool, wherein the one or more validation elements comprises at least one validation element at the first end portion and at least one validation element at the second end portion. Consequently, each camera can be calibrated by capturing an image of the validation elements in the respective portion. Preferably, the one or more validation elements comprises a first group of two or more validation elements at the first end portion and a second group of two or more validation elements at the second end portion. More preferably, each group comprises three or more validation elements.

In another embodiment the one or more calibration elements and/or the one or more validation elements are through-holes. Hence, the calibration tool can be used in a back-light system where a light bar is provided at one side of the calibration tool and the camera is provided at an opposite side of the calibration tool to capture the light that passes through the through holes.

In another embodiment the one or more calibration elements comprise stepped features that enable the measuring system to be calibrated in the height direction as well.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
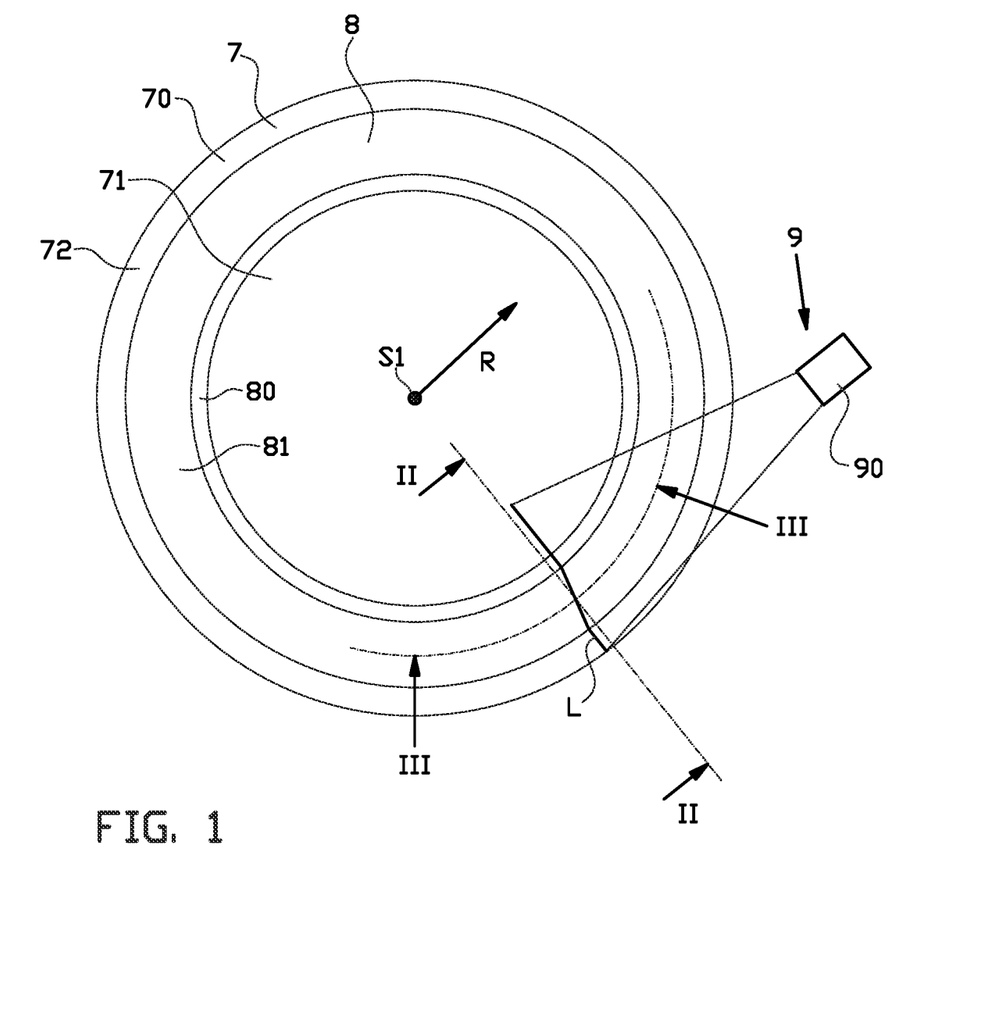
FIG. 1 shows a top view of a bead-apex drum with a bead-apex applied to it and a measuring system for measuring the bead-apex.
Figure 2:
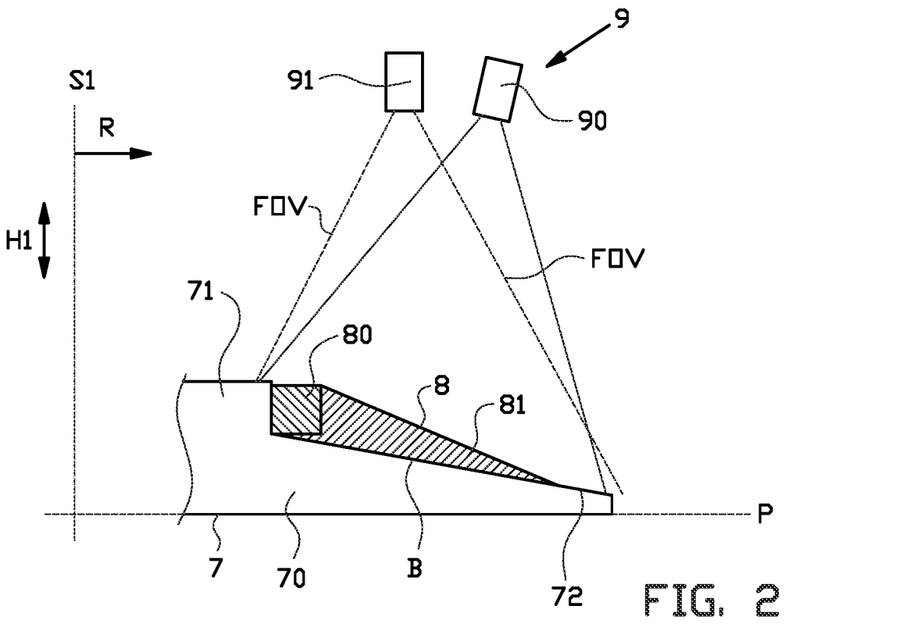
FIG. 2 shows a cross section view of the bead-apex drum and the bead-apex according to line II-II in FIG. 1.
Figure 3:
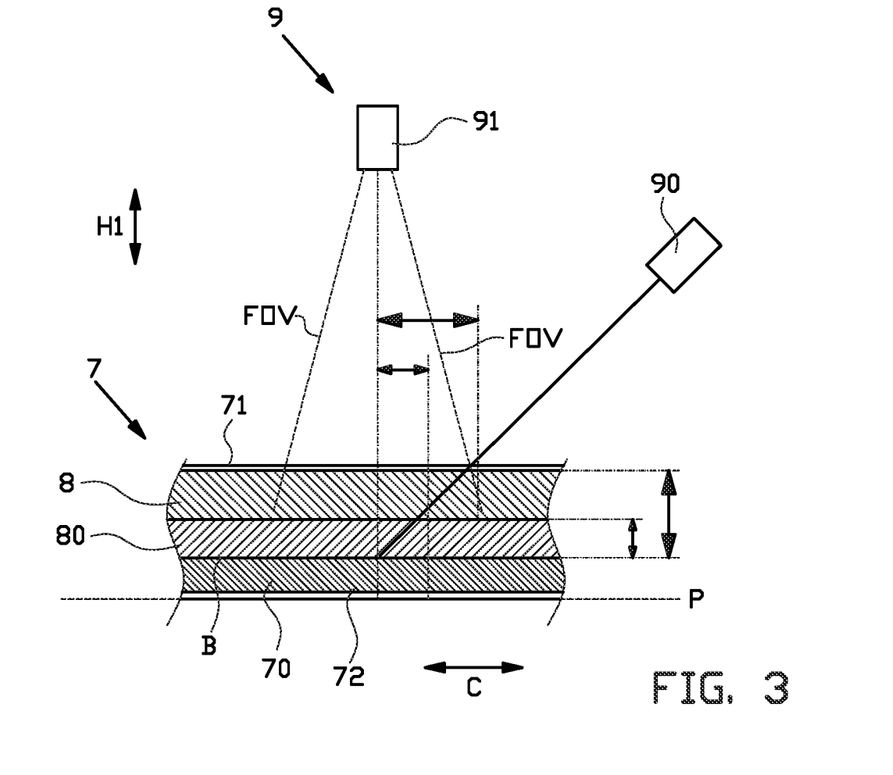
FIG. 3 shows a cross section view of the bead-apex drum and the bead-apex according to line in FIG. 1.

FIGS. 1, 2 and 3 show a bead-apex drum 7 for producing a bead-apex 8. In this exemplary embodiment, the bead-apex drum 7 is formed as a circular disc 70 having a central hub 71 and a bead-apex support surface 72 extending circumferentially about the central hub 71. The bead-apex drum 7 has a reference plane P, i.e. its mounting plane or its bottom surface, and a base profile B for supporting a bead-apex 8 relative to the reference plane P. The bead-apex drum 7 is typically mounted to a drum seat or drum drive (not shown) and driven in rotation about a rotation axis 51 extending concentrically through the central hub 71 in a direction perpendicular to the reference plane P.

A bead-apex 8 is formed by first applying a bead 80 on the bead-apex support surface 72 around the central hub 71 of the bead-apex drum 7, followed by an apex 81 that is applied around the bead 80. The bead-apex support surface 72 may be slightly angled to assume a conical orientation, i.e. at an oblique angle to the reference plane P. Different bead-apex drums may be provided for different bead-apexes, depending on their respective dimensions, i.e. diameter, thickness and conicity.

FIGS. 1, 2 and 3 further show a measuring system 9 for measuring the bead-apex 8 on the bead-apex drum 7. Said measuring system 9 is preferably a laser-triangulation measuring system, having a laser 90 for projecting a laser line L on the bead-apex 8 and a camera 91 for capturing an image of said projected laser line L. The camera 91 has a field of view FOV as shown in FIG. 2.

FIGS. 4-7 show a calibration tool 1 for calibrating the measuring system 9 as shown in FIGS. 1, 2 and 3. The calibration tool 1 is arranged to be placed in the same position as the bead-apex drum 7. In other words, the calibration tool 1 temporarily replaces the bead-apex drum 7 when the measuring system 9 is to be calibrated.

Figure 4:
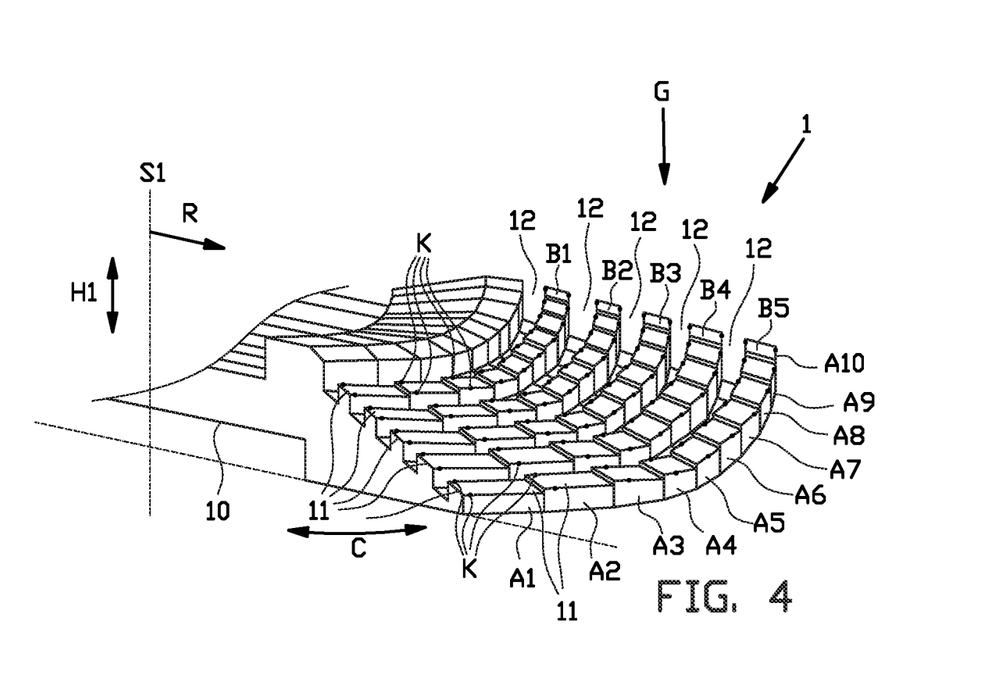
FIG. 4 shows a view of a calibration tool according to a first embodiment of the invention to replace the bead-apex drum during a calibration method.

As shown in FIG. 4, the calibration tool 1 comprises a tool body 10 that is rotatable relative to the measuring system 9 about a rotation axis 51 perpendicular to a reference plane P. Preferably, the calibration tool 1 replaces the bead-apex drum such that the rotation axis 51 of the calibration tool 1 corresponds to the rotation axis 51 of the bead-apex drum 7 prior to its removal. Moreover, the tool body 10 may have similar mounting features, i.e. a mounting plane that extends in the same plane as the mounting plane of the bead-apex drum prior to its removal. More in particular, the reference planes P for measuring height on the bead-apex drum 7 and the calibration tool 1 may be the same. Hence, the calibration tool 1 can be representative of at least some characteristics of the bead-apex drum 7.

The rotation axis 51 extends in an axial direction and defines a radial direction R perpendicular to the rotation axis 51 and a circumferential direction C about said rotation axis 51.

In this exemplary embodiment, the tool body 10 extends over only a part of a full circumference about the rotation axis 51. In particular, the tool body 10 is formed as a circular segment. The tool body 10 may for example extend over less than one-hundred-and-eighty degrees of the circumference about the rotation axis 51, preferably over less than one-hundred-and-twenty degrees. Alternatively, the tool body may extend over a full circumference, i.e. to form a disc-like tool body similar to the disc-like bead-apex drum. The tool body may also be shaped as an annulus or ring, provided that it can still be rotatably mounted about the rotation axis 51. The tool body 10 may have an integral or Monobloc shape. Alternatively, the tool body 10 may comprise several interconnected parts, elements, segments or sections that form the different features of the tool body 10, as described below.

Figure 5:
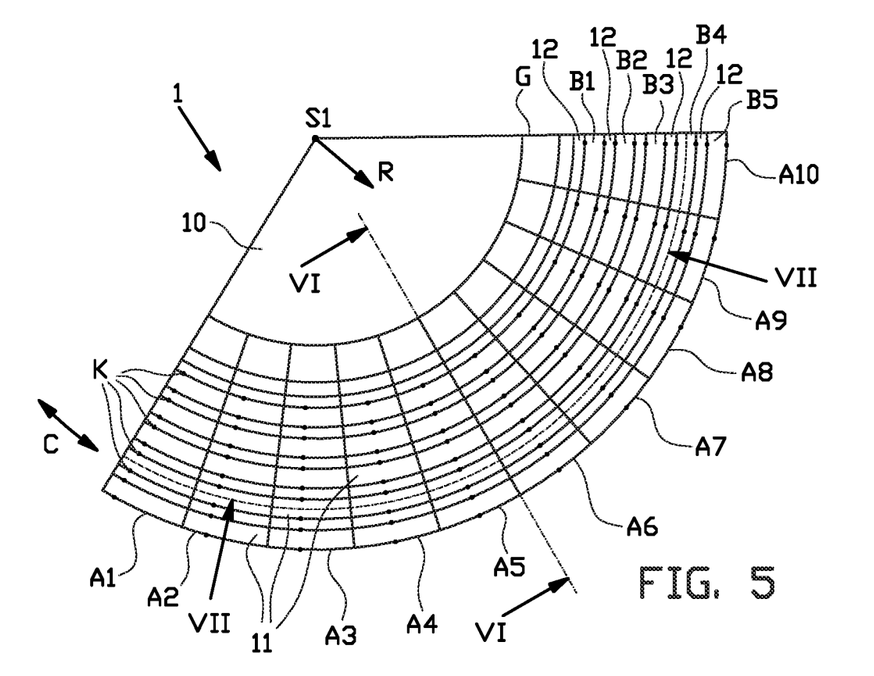
FIG. 5 shows a top view of the calibration tool according to FIG. 4.

As best seen in FIGS. 4 and 5, the tool body 10 is provided with a plurality of calibration surfaces 11 that define a pattern G of calibration positions K. In this exemplary embodiment every calibration surface 11 is distinct from the other calibration surfaces 11, i.e. delimited from the other calibration surfaces 11 by a clear boundary. The calibration surfaces 11 may for example be formed by distinct interconnected parts of the tool body 10. Hence, every calibration surface 11 can be measured as an individual surface. Alternatively, the pattern G may be formed by a single, continuous calibration surface (not shown), in which case the calibration positions K are merely virtual or imaginary, i.e. the calibration positions K are chosen by the measuring system 9 according a predetermined pattern. A continuous surface may hold an infinite number of calibration positions K, only limited by the accuracy of the camera 91.

In FIG. 5, the pattern G comprises ten columns A1-A10 extending in the radial direction R away from the rotation axis 51 and five rows B1-B5 extending in the circumferential direction C about the rotation axis 51. As such, a radial grid of calibration positions K can be formed. The number of columns A1-A10 and rows B1-B5 may be chosen differently when a higher or lower amount of calibration positions K is required. A minimum of three columns and three rows seems necessary to provide at least some useful amount of feedback to the measuring system 9.

Figure 6:
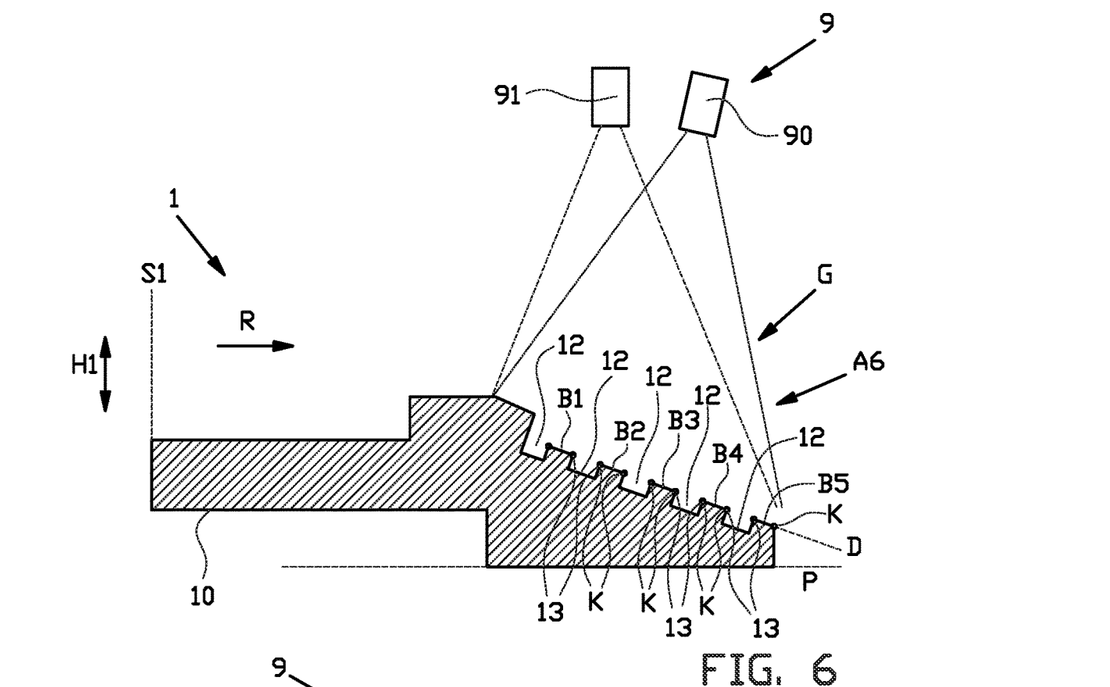
FIG. 6 shows a cross section view of the calibration tool according to line VI-VI in FIG. 5.

As best seen in the radial cross section of FIG. 6, for each column A1-A10 the tool body is provided with recesses 12 extending between the calibration surfaces 11 within the respective column A1-A10. Each recess 12 spaces apart two calibration surfaces 11 in the radial direction R. At each transition from the respective calibration surface 11 to an adjacent one of the recesses 12 each calibration surface 11 within the respective column A1-A10 defines a calibration edge 13. Conveniently, at least one of the calibration positions K may be chosen at one of said calibration edges 13.

As best seen in the radial cross section of FIG. 6, for each column A1-A10 the calibration positions K within said respective column A1-A10 vary in height relative to the reference plane P in a height direction H perpendicular to said reference plane P and/or parallel to the rotation axis Sl. Similarly, as best seen in the circumferential cross section of FIG. 7, for each row B1-B5 the calibration positions K within the respective row also vary in height in the height direction H relative to the reference plane P.

In this exemplary embodiment, for each column A1-A10, the calibration surfaces 11 within the respective column A1-A10 extend in a common plane D, as shown in FIG. 6. The common plane D extends at an oblique angle to the reference plane P. Alternatively, the calibration surfaces 11 may be in different planes, i.e. in stepped and/or parallel planes (not shown). When using stepped calibration surfaces 11 in the columns A1-A10, the recesses 12 are not necessary to distinguish between the calibration surfaces 11. The oblique angle may be different or the same for every column A1-A10 to reflect different shapes of apexes.

Figure 7:
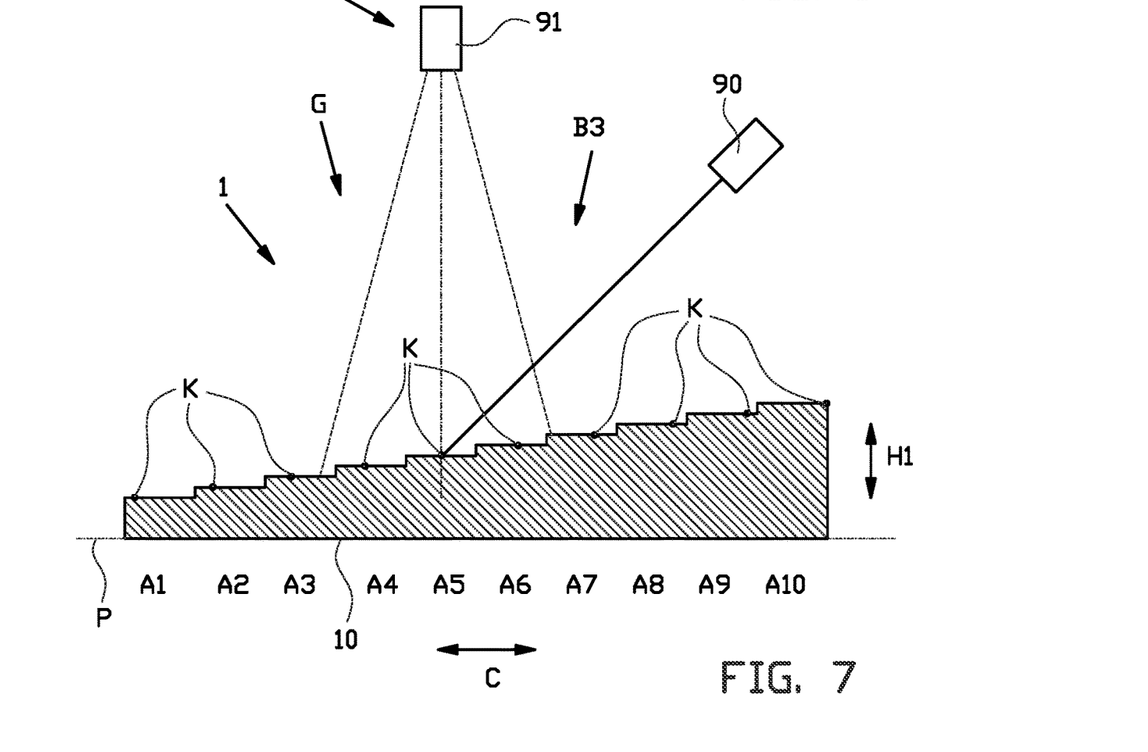
FIG. 7 shows a cross section view of the calibration tool according to line VII-VII in FIG. 5.

As shown in FIG. 7, for each row, the calibration surfaces 11 within the respective row are stepped in the height direction H from one of the calibration surfaces 11 to the next one of the calibration surfaces 11 in the circumferential direction C. Because of the steps between the calibration surfaces 11, no recesses are necessary. If the calibration surfaces 11 in the respective row B1-B5 are however arranged in a common plane (not shown) similar to the calibration surfaces 11 in the columns A1-A10, then recesses may be provided between the calibration surfaces 11 in the respective row B1-B5 as well.

The skilled person will appreciate from the above paragraphs that the shape and relative orientation of the calibration surfaces 11 is open to variation and that the scope of the present invention is not necessarily limited to any particular shape, as long as the technical effect of providing a plurality of calibration positions K in a pattern G is obtained. The transition from one calibration surface 11 to another can for example be stepped, abrupt, gradual or smooth.

As best seen in FIG. 6, for each column A1-A10, all calibration positions K within the respective column A1-A10 have different heights in the height direction H relative to the reference plane P. More in particular, the calibration positions K within the respective column A1-A10 are sequentially or progressively reduced in height relative to the reference plane P in the radial direction R away from the rotation axis S1. Preferably, the sequential reduction in height has a constant decrement or decrease relative to the reference plane P.

As best seen in FIG. 7, for each row B1-B5 all calibration positions K within the respective row B1-B5 have different heights in the height direction H relative to the reference plane P. More in particular, the calibration positions K within the respective row B1-B5 are sequentially or progressively increased in height relative to the reference plane P in the circumferential direction C. Preferably, the sequential increase in height has a constant increment relative to the reference plane P.

Consequently, as shown in FIG. 4, each calibration position K within the pattern G has a height in the height direction H relative to the reference plane P that is different from the heights of the other calibration positions K relative to the reference plane P in the same column A1-A10 and the same row B1-B5. In other words, each column A1-A10 of calibration positions K forms a height profile with a different height at each calibration position K, while each calibration position K in the respective column A1-A10 also has a different height compared to the other calibration positions K in the same row B1-B5. Preferably, the decrement in the columns A1-A10 is the same for each column A1-A10 and/or the increment in each row B1-B5 is the same for each row B1-B5. In that case, the height profiles are all equally offset from one column A1-A10 to the next.

The varying heights of the calibration surfaces 11 relative to the reference plane P are predetermined, i.e. measured and verified prior to the calibration, so that the measurements of the measuring system 9 may be compared to the predetermined heights of the calibration surfaces 11 to calibrate the measuring system 9.

A method for calibrating the measurement system 9, in particular the laser-triangulation measurement system, with the use of the aforementioned calibration tool 1 will be elucidated below with reference to FIGS. 1-7.

The method comprises the steps of:
a) providing the calibration tool 1 at least partially within the field of view FOV of the camera 91, as shown in FIG. 6;
b) projecting a laser line L onto the calibration tool 1 with the laser-triangulation measuring system 9, as shown in FIG. 5;
c) rotating the calibration tool 1 about the rotation axis 51 such that the laser line L is projected on all calibration positions K of a respective one of the columns A1-A10;
d) capturing an image of the laser line L projected on all calibration positions K of the respective column A1-A10 with the camera 91; and
e) repeating the steps c) and d) for another one of the columns A1-A10.

In step a) the calibration tool 1 may be provided with its reference plane P in the same position as the reference plane P of the bead-apex drum 7 during the bead-apex production. Hence, the measuring system 9 does not have to be adjusted to capture images of the calibration tool 1.

By capturing the image of the laser line L in step d), calibration data can be collected regarding the height profile of the respective column A1-A10. In particular, any transitions, edges or changes in height can be captured and processed by a suitable processor in the measuring system 9. Preferably, step e) involves repeating steps c) and d) for all of the other columns A1-A10. Hence, the maximum amount of calibration data can be collected.

For each column A1-A10, the calibration positions K may be located on the calibration edges 13, as shown in FIG. 6, so that the measuring system 9 can recognize the transition at the calibration edge 13 as a calibration position K.

When the image is captured in step e), the measuring system 9 can be calibrated by correlating pixels in each captured image corresponding to the calibration positions K of a respective column A1-A10 to the predetermined heights of said calibration positions K within said respective column A1-A10. In particular, the captured heights of the calibration positions K within the respective column A1-A10 can be used to determine a scale for a pixel to real-world units conversion, i.e. from pixels to micrometers, millimeters or centimeters.

Optionally, the method may further comprises the step of:
f) providing an empty bead-apex drum 7 relative to the laser-triangulation measuring system 9 prior to or after steps a) to e), as shown in FIGS. 1-3 but without the bead-apex 8;
g) projecting a laser line L onto the empty bead-apex drum 7 with the laser-triangulation measuring system 9;
h) capturing an image of the laser line L projected on the empty bead-apex drum 7; and
i) determining the base profile B of the empty bead-apex drum 7 relative to the reference plane P of the empty bead-apex drum 7.

In step f) the bead-apex drum 7 is provided with its reference plane P in the same position as the reference plane P of the calibration tool. Hence, the measuring system 9 does not have to be adjusted. Moreover, the height of the determined base profile B can be easily compared to the heights of the calibration positions K as they are measured relative to the same reference plane P.

Finally, the method may comprise the steps of:
j) providing a bead-apex 8 on the bead-apex drum 7, as shown in FIGS. 1-3;
k) measuring the bead-apex 8 using the measuring system 9, as shown in FIGS. 1-3; and
l) subtracting the base profile B of the empty bead-apex drum 7 as determined in step i) from the measurements.

The result of the subtraction can be representative of the actual height of the bead-apex 8 relative to the bead-apex drum 7 in the height direction H.

Figure 8:
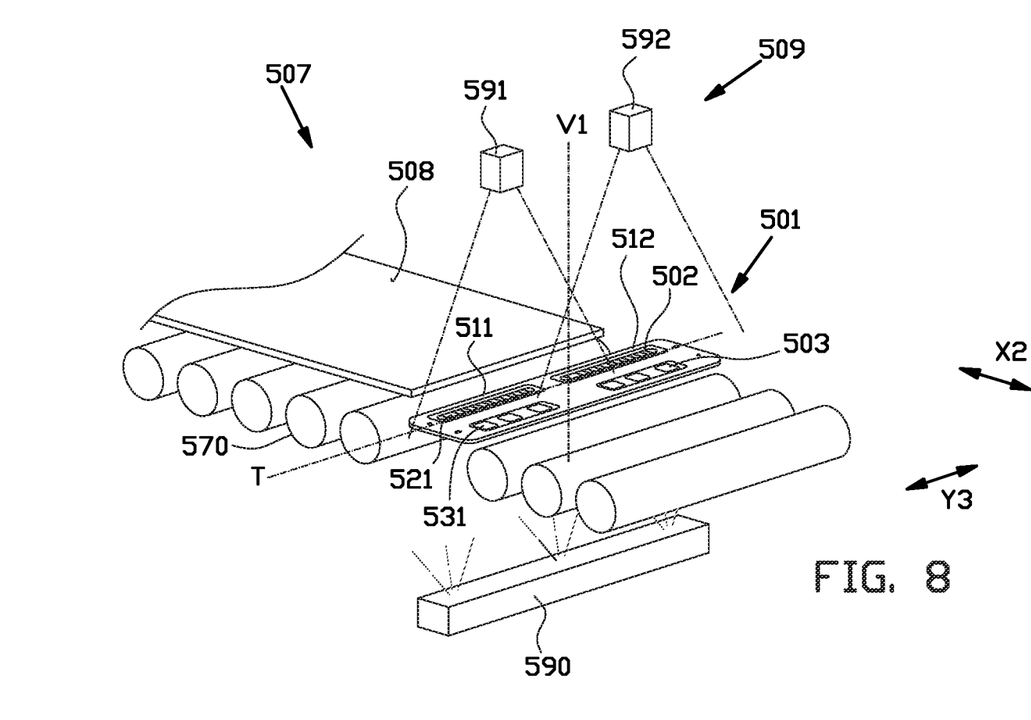
FIG. 8 shows an isometric view of a production line for strips or sheets, a measuring system and a calibration tool according to a second embodiment of the invention.

FIG. 8 shows a strip production line 507 for producing strips 508, in particular for the tire manufacturing. The strip production line 507 comprises a conveyor 570, in this example a roller conveyor, which is interrupted along a measuring line T at a measuring position to allow a measuring system 509 to measure of characteristics of the strip 508, i.e. a tread, a carcass or a breaker ply, or the folding of a gum strip around the edge of a breaker, as it passes across the interruption. In particular, the width of the strip 508 is measured at the measuring line T. In this example, the measuring system 509 comprises a back-light unit 590 for emitting light towards the measuring line T and a first camera 591 and a second camera 592 opposite to the back-light unit 590 to detect the light passing at the measuring line T along the side edges of the strip 508 in a manner known per se.

To calibrate the measurements of the measuring system 509, a calibration tool 501 is provided. The calibration tool 501 is arranged to be mounted between the back-light unit 590 and the cameras 591, 592 in the measuring position. As shown in more detail in FIG. 9, the calibration tool 501 comprises a tool body 510 extending in a longitudinal direction Y3.

Figure 9:
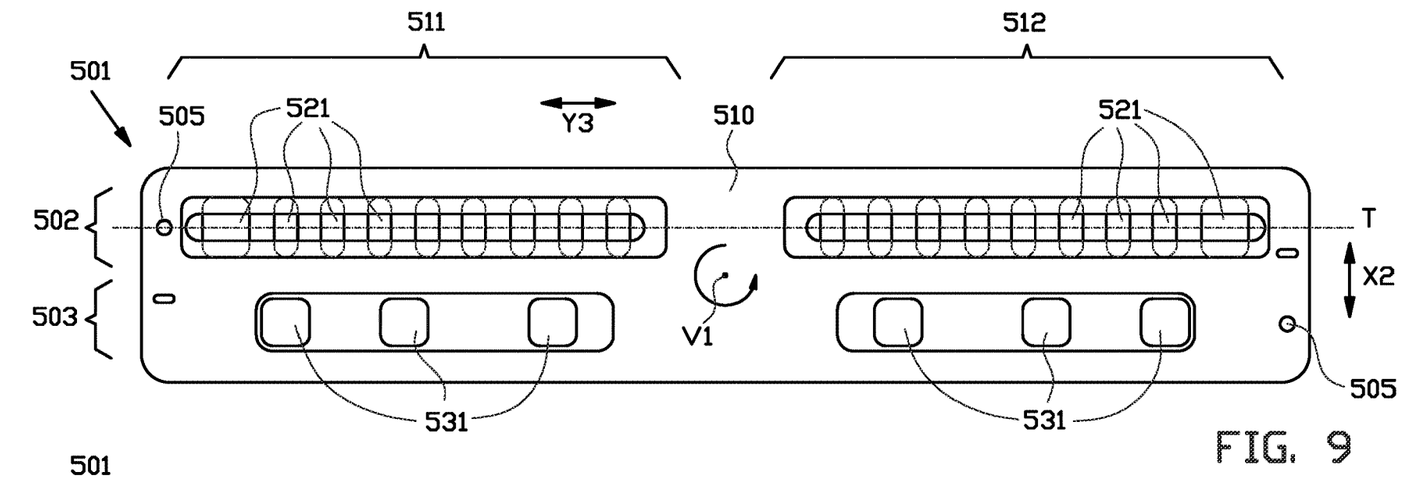
FIG. 9 shows a top view of the calibration tool of FIG. 8 in isolation in a calibration position.

The tool body 510 comprises a calibration section 502 with one or more calibration elements 521 and a validation section 503 with one or more validation elements 531. In FIG. 9, the calibration tool 501 is positioned in a calibration position in which the longitudinal direction Y of the tool body 510 extends parallel or substantially parallel to the measuring line T. In the calibration position the measuring line T extends across the one or more calibration elements 521 of the calibration section 502.

Figure 10:
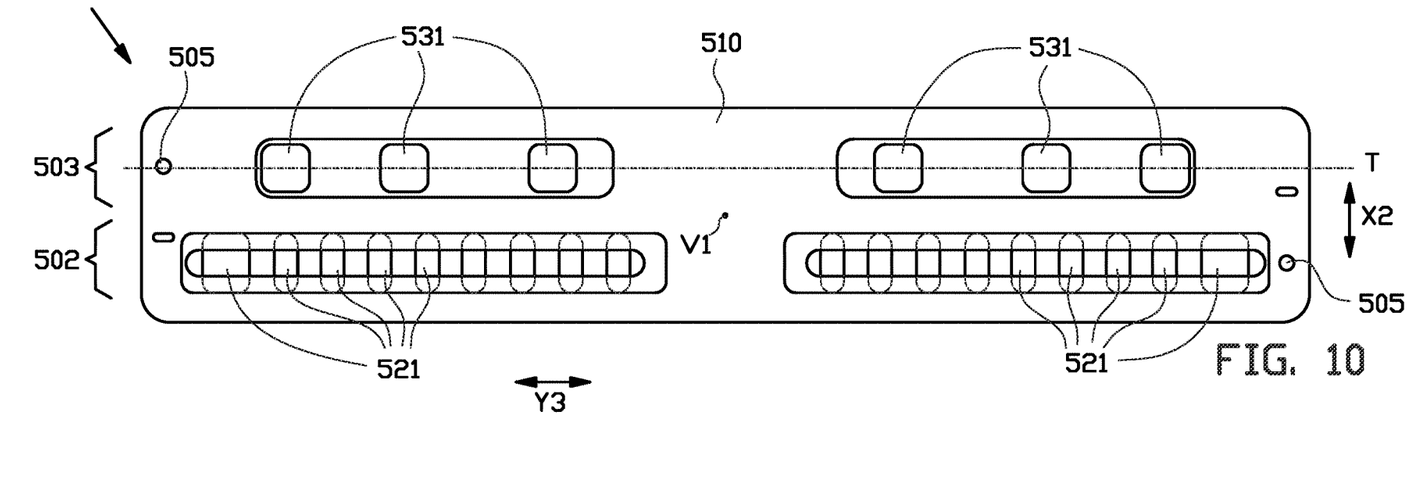
FIG. 10 shows a top view of the calibration tool of FIG. 9 in a validation position.

The calibration tool 501 is reversible or invertible about an inverting axis V1 between the calibration position, as shown in FIG. 9, and a validation position, as shown in FIG. 10. In the validation position, the measuring line T extends across the one or more validation elements 531 of the validation section 503. Hence, the calibration section 502 and the validation section 503 are effectively inverted. In other words, the calibration section 502 and the validation section 503 alternate positions at the measuring line T or switch positions when inverting about the inverting axis V1.

Preferably, the calibration section 502 and the validation section 503 are arranged adjacent to each other in a lateral direction X2 perpendicular to the longitudinal direction Y3. In this exemplary embodiment, the inverting axis V1 extends perpendicular to the longitudinal direction Y3 and the lateral direction X2 between the calibration section 502 and the validation section 503. More in particular, in this specific embodiment, the inverting axis V1 is upright, vertical or substantially vertical. Alternatively, the inverting axis may also extend parallel to the measuring line T between the calibration section 502 and the validation section 503 or parallel to the lateral direction X2 through the center of both sections 502, 503.

As shown in FIG. 9, the calibration tool 501 comprises one or more mounting elements 505 for mounting the calibration tool 501 to a support relative to the measuring system 509 of FIG. 8. As shown by comparing FIG. 9 and FIG. 10, preferably, at least one of the one or more mounting elements 505 is in the same position after inverting the calibration tool 501 about the inverting axis V1. Hence, the calibration tool 501 can be mounted in substantially the same way in both positions.

As shown in FIGS. 9 and 10, the one or more calibration elements 521 comprises a plurality of calibration elements 521 arranged in a pattern extending in the longitudinal direction Y3 of the calibration tool 501. Similarly, the one or more validation elements 531 comprises a plurality of validation elements 531. However, the validation elements 531 are offset in the longitudinal direction Y3 with respect to the calibration elements 521.

As best seen in FIG. 9, the first camera 591 and the second camera 592 are arranged for observing a first end portion 511 and a second end portion 512, respectively, of the calibration tool 501. In particular, the camera 591, 592 observe a region of the calibration tool 501 where the side edges of the strip 508 would normally pass across the measuring line T. The one or more validation elements 531 comprises a first group of two or more validation elements 531 at the first end portion 511 and a second group of two or more validation elements 531 at the second end portion 512. Preferably, each group comprises three or more validation elements 531.

In this exemplary embodiment, the one or more calibration elements 521 and/or the one or more validation elements 531 are through-holes. This makes the calibration tool 501 suitable for use in a back-light measuring system. Alternatively, the calibration elements and validation elements may be provided as slits or protrusions, for example when calibrating and validating a laser-triangulation measuring system.

Figure 11:
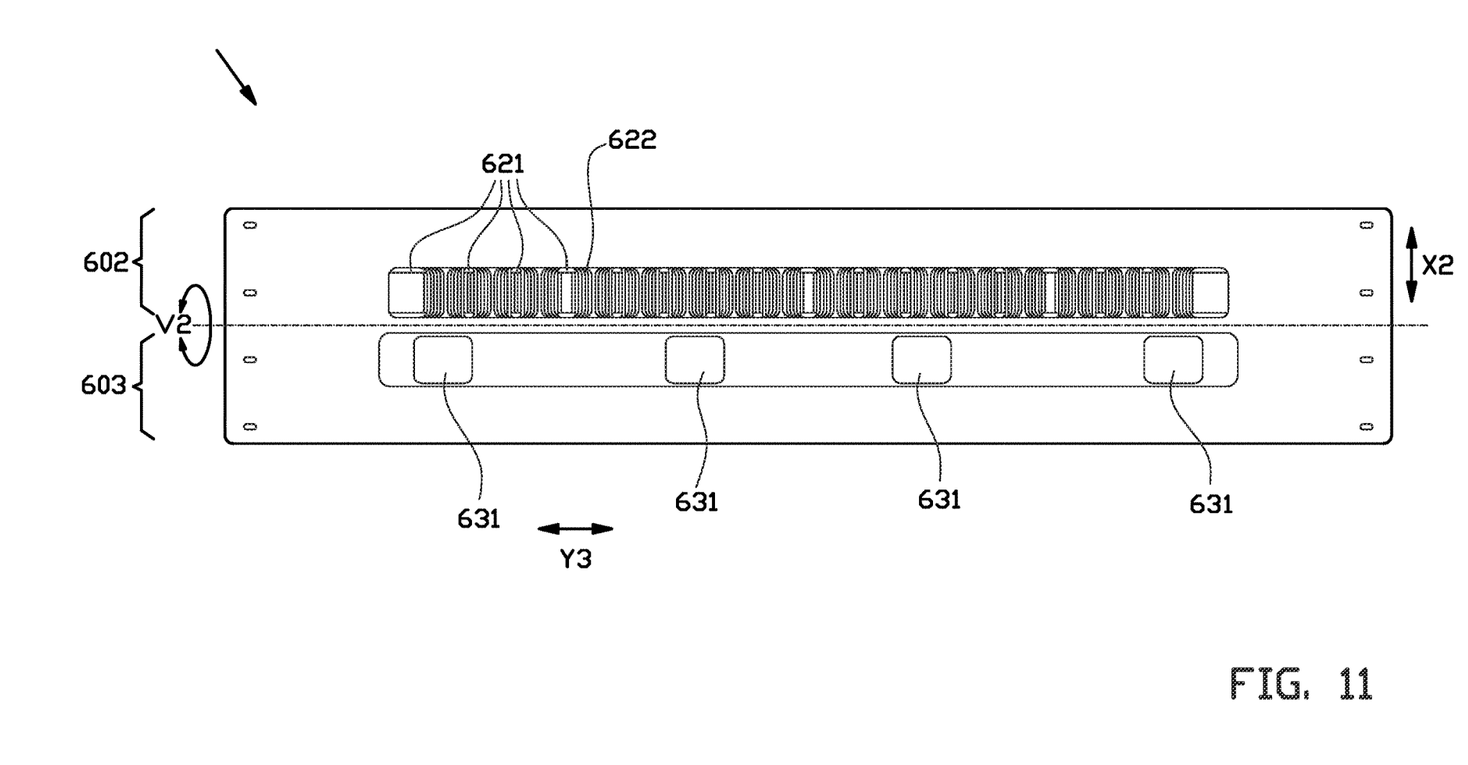
FIG. 11 shows a top view of a calibration tool according to a third embodiment of the invention.
Figure 12:
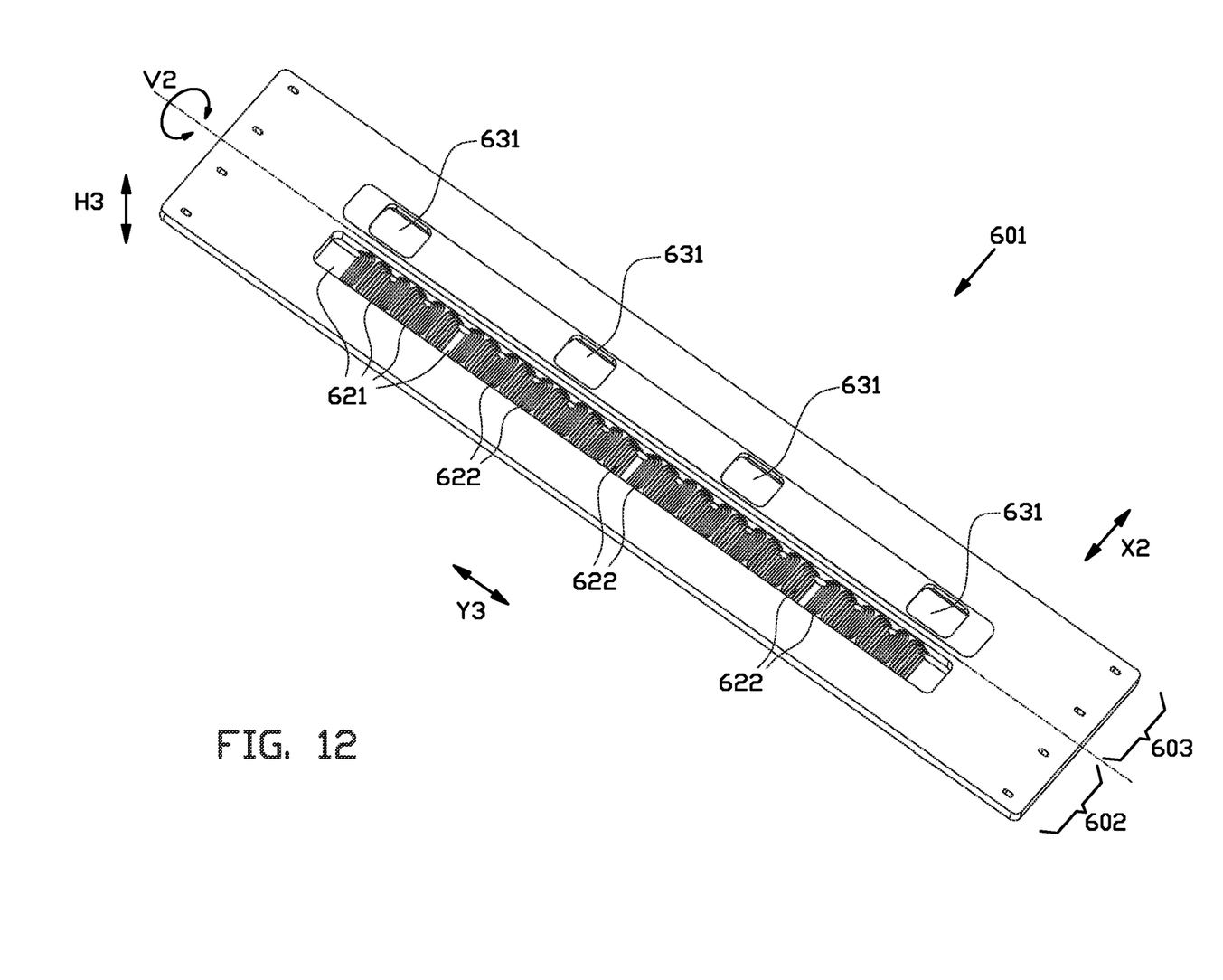
FIG. 12 shows an isometric view of the calibration tool according to FIG. 11.

FIGS. 11 and 12 show an alternative calibration tool 601 according to a third embodiment of the invention that differs from the calibration tool 501 according to the second embodiment of the invention in that has a calibration section 602 with one or more calibration elements 621 which are stepped or have stepped features 622 in a height direction H3 perpendicular to the longitudinal direction Y3 to allow for a more accurate calibration of the height measurements of the cameras. The validation section 603 again has validation elements 631 that are offset in the longitudinal direction Y3 with respect to the calibration elements 621. Like the previously discussed calibration tool 501 according to the second embodiment of the invention, the alternative calibration tool 601 is reversible or invertible about an inverting axis V2 between the calibration position and a validation position. The inverting axis V2 in this case extends in the longitudinal direction Y3 between the calibration section 602 and the validation section 603.

In some of the embodiments described above, the verification of the measurements of the measuring system can be performed in-line, meaning that the tire components can be measured while simultaneously measuring one or more of the verification elements. In such embodiments, the verification element is provided within the field of view of at least one of the cameras of the measuring system. The verification step can then be repeated over time, during regular intervals or even continuously.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A calibration tool for calibrating a laser-triangulation measuring system,
   wherein the calibration tool comprises a tool body that is rotatable relative to the measuring system about a rotation axis perpendicular to a reference plane,
   wherein the tool body is provided with one or more calibration surfaces that define a pattern of calibration positions,
   wherein the pattern comprises at least three columns distributed in a circumferential direction about the rotation axis and each extending in a radial direction away from the rotation axis and at least three rows distributed in the radial direction and each extending in the circumferential direction about the rotation axis,
   wherein for each of the at least three columns the calibration positions within said respective column vary in height relative to the reference plane in a height direction perpendicular to said reference plane, and
   wherein for each of the at least three rows the calibration positions within the respective row vary in height in the height direction relative to the reference plane.

2. The calibration tool according to claim 1, wherein the pattern forms a radial grid of calibration positions.

3. The calibration tool according to claim 1, wherein for each of the at least three columns at least half of the calibration positions within the respective column have different heights in the height direction relative to the reference plane.

4. The calibration tool according to claim 1, wherein for each of the at least three columns the calibration positions within the respective column are sequentially reduced in height relative to the reference plane in the radial direction away from the rotation axis.

5. The calibration tool according to claim 4, wherein the sequential reduction in height has a constant decrement relative to the reference plane.

6. The calibration tool according to claim 4, wherein the sequential reduction in height follows a curvature.

7. The calibration tool according to claim 1, wherein for each of the at least three rows at least half of the calibration positions within the respective row have different heights in the height direction relative to the reference plane.

8. The calibration tool according to claim 1, wherein for each of the at least three rows the calibration positions within the respective row are sequentially increased in height relative to the reference plane in the circumferential direction.

9. The calibration tool according to claim 8, wherein the sequential increase in height has a constant increment relative to the reference plane.

10. The calibration tool according to claim 1, wherein each calibration position within the pattern has a height in the height direction relative to the reference plane that is different from the heights of the other calibration positions relative to the reference plane in the same column and the same row.

11. The calibration tool according to claim 1, wherein for each of the at least three columns the one or more calibration surfaces comprises an individual calibration surface for each calibration position within the respective column.

12. The calibration tool according to claim 11, wherein for each of the at least three columns the tool body is provided with recesses extending between the calibration surfaces within the respective column to space apart said calibration surfaces in the radial direction.

13. The calibration tool according to claim 12, wherein each calibration surface within the respective column defines a calibration edge at each transition from the respective calibration surface to an adjacent one of the recesses, wherein at least one of the calibration positions is located at one of said calibration edges.

14. The calibration tool according to claim 11, wherein for each of the at least three columns the calibration surfaces within the respective column extend in a common plane, wherein said common plane extends at an oblique angle to the reference plane.

15. The calibration tool according to claim 1, wherein for each row the one or more calibration surfaces comprises an individual calibration surface for each calibration position within the respective row.

16. The calibration tool according to claim 15, wherein for each of the at least three rows the calibration surfaces within the respective row are stepped in the height direction from one of the calibration surfaces to the next one of the calibration surfaces in the circumferential direction.

17. The calibration tool according to claim 1, wherein the pattern comprises at least five columns.

18. The calibration tool according to claim 1, wherein the pattern comprises at least four rows.

19. The calibration tool according to claim 1, wherein the tool body extends over only a part of a full circumference about the rotation axis.

20. The calibration tool according to claim 19, wherein the tool body is formed as a circular segment.

21. A method for calibrating a laser-triangulation measuring system with the use of the calibration tool according to claim 1,
wherein the laser-triangulation measuring system comprises a laser and a camera with a field of view,
wherein the method comprises the steps of:
 a) providing the calibration tool at least partially within the field of view of the camera;
 b) projecting a laser line onto the calibration tool with the laser-triangulation measuring system;
 c) rotating the calibration tool about the rotation axis such that the laser line is projected on all calibration positions of a respective one of the columns; and
 d) capturing an image of the laser line projected on all calibration positions of the respective column with the camera.

22. The method according to claim 21, wherein the method further comprises the step of;
 e) repeating the steps c) and d) for another one of the columns.

23. The method according to claim 22, wherein step e) comprises the step of repeating steps c) and d) for all of the other columns.

24. The method according to claim 21, wherein the heights of the calibration positions of each of the at least three columns relative to the reference plane are predetermined,
wherein the method further comprises the step of calibrating the laser-triangulation measuring system by correlating pixels in each captured image corresponding to the calibration positions of a respective column to the predetermined heights of said calibration positions within said respective column.

25. The method according to claim 21, wherein the method further comprises the step of:
 f) providing an empty bead-apex drum relative to the laser-triangulation measuring system prior to or after steps a) to d), wherein the bead-apex drum has a reference plane and a base profile for supporting a bead-apex relative to the reference plane, wherein the empty bead-apex drum is provided with its reference plane in the same position as the reference plane of the calibration tool;
 g) projecting a laser line onto the empty bead-apex drum with the laser-triangulation measuring system;
 h) capturing an image of the laser line projected on the empty bead-apex drum; and
 i) determining the base profile of the empty bead-apex drum relative to the reference plane of the empty bead-apex drum.

26. The method according to claim 25, wherein the method further comprises the steps of:
 j) providing a bead-apex on the bead-apex drum;
 k) measuring the bead-apex using the measuring system; and
 l) subtracting the base profile of the empty bead-apex drum as determined in step i) from the measurements.

* * * * *